E. M. SCHANTZ.
INSTRUCTING INDICATOR FOR MUSICAL INSTRUMENTS.
APPLICATION FILED OCT. 13, 1913.
1,324,275.
Patented Dec. 9, 1919.
4 SHEETS—SHEET 1.
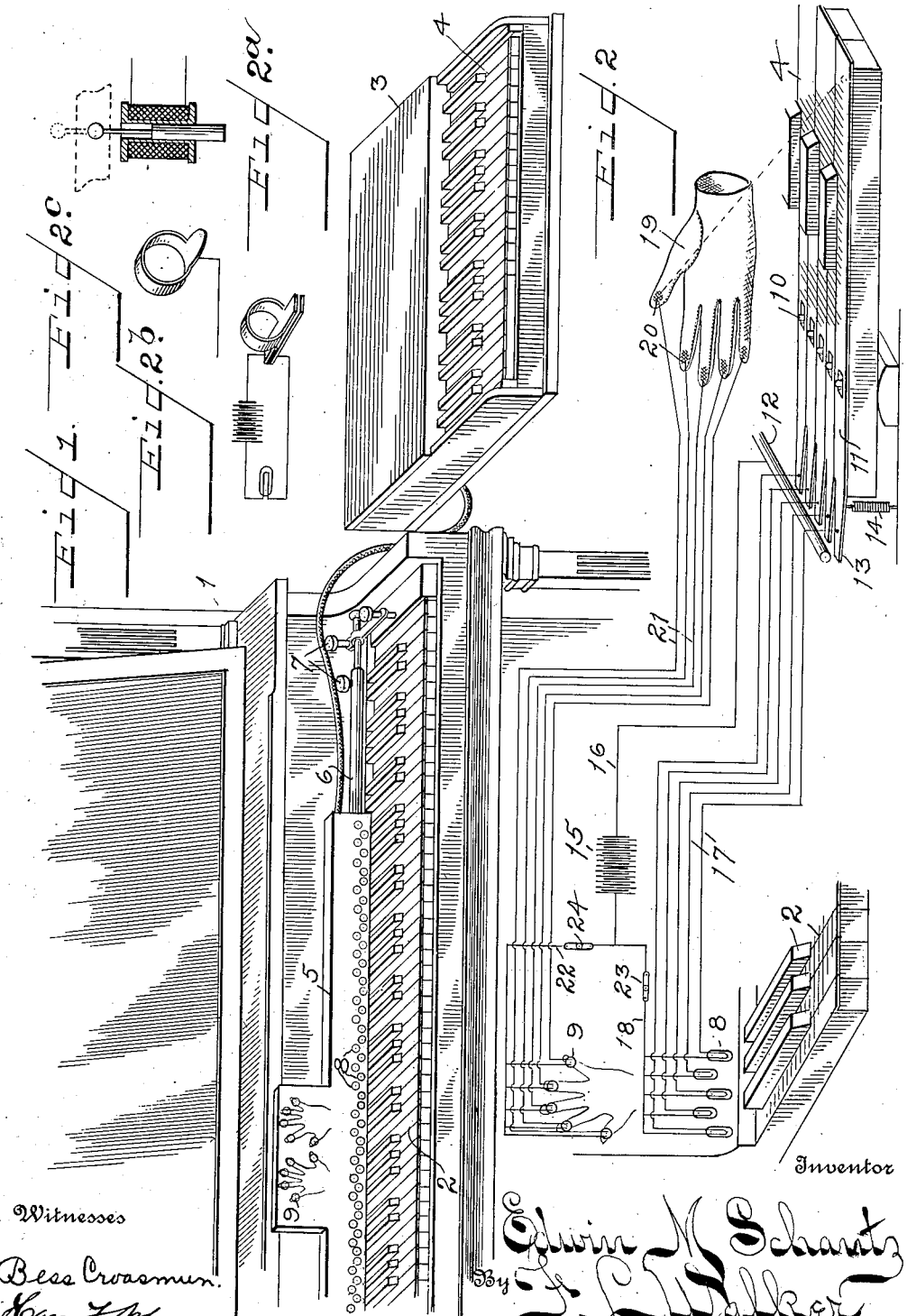

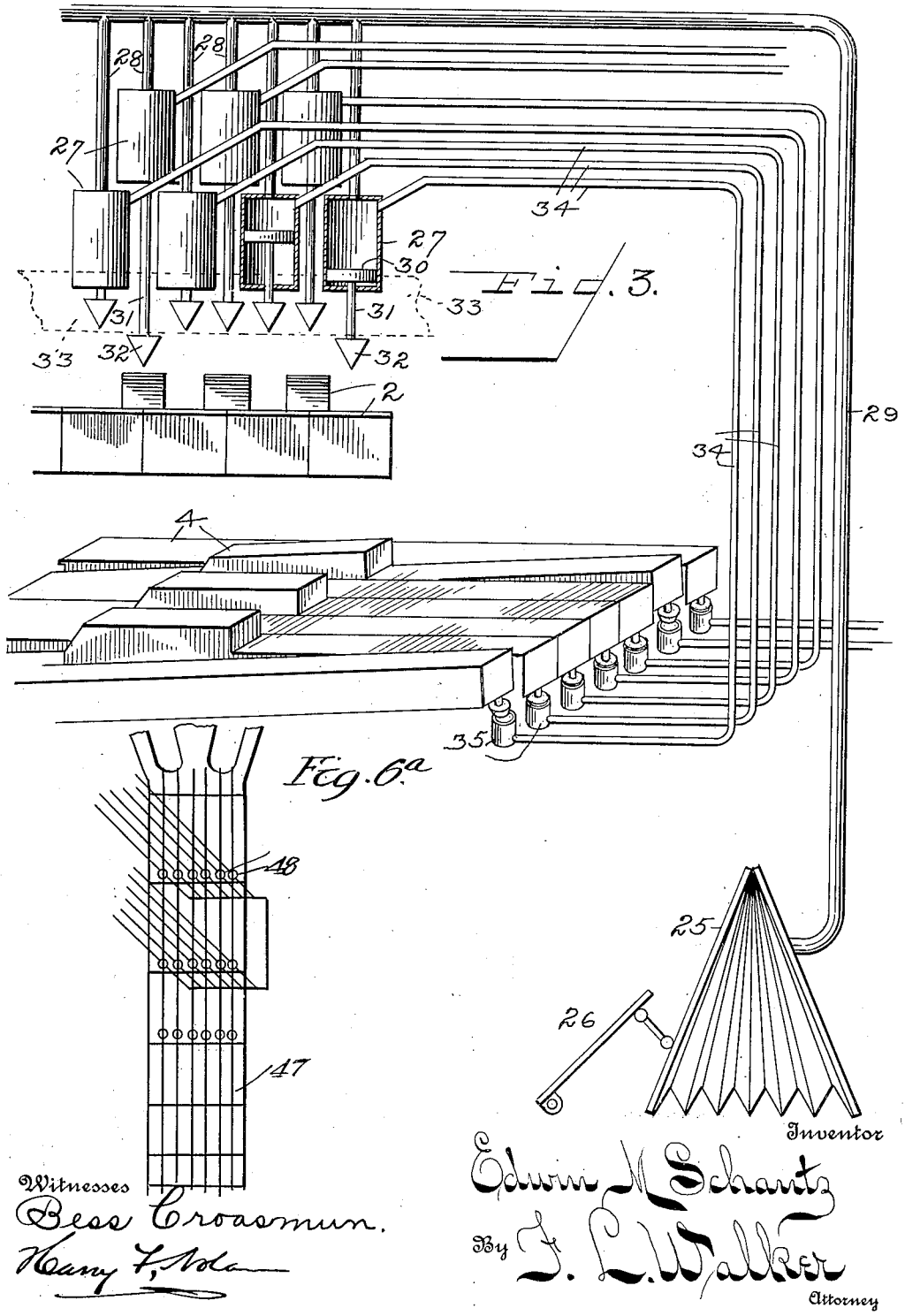

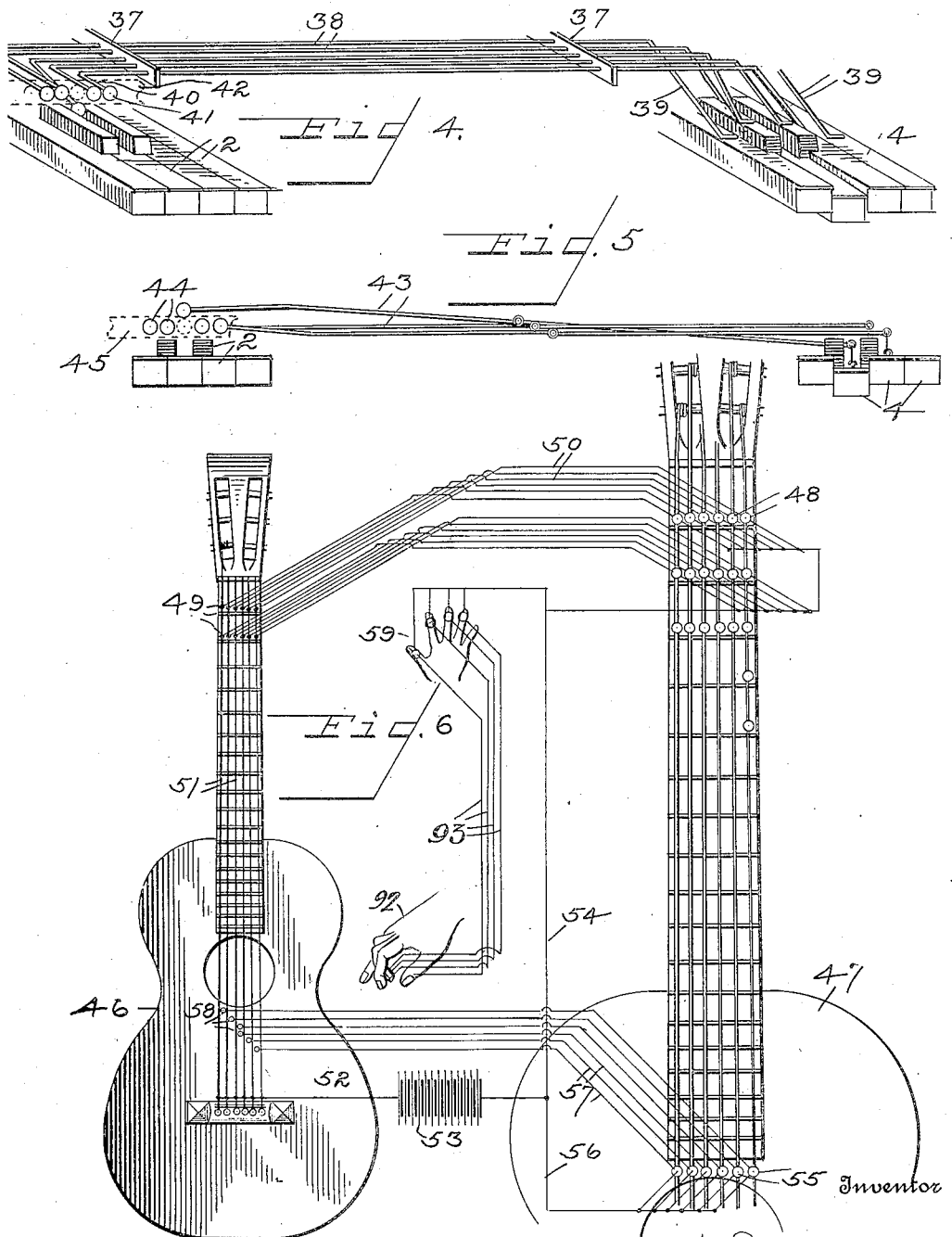

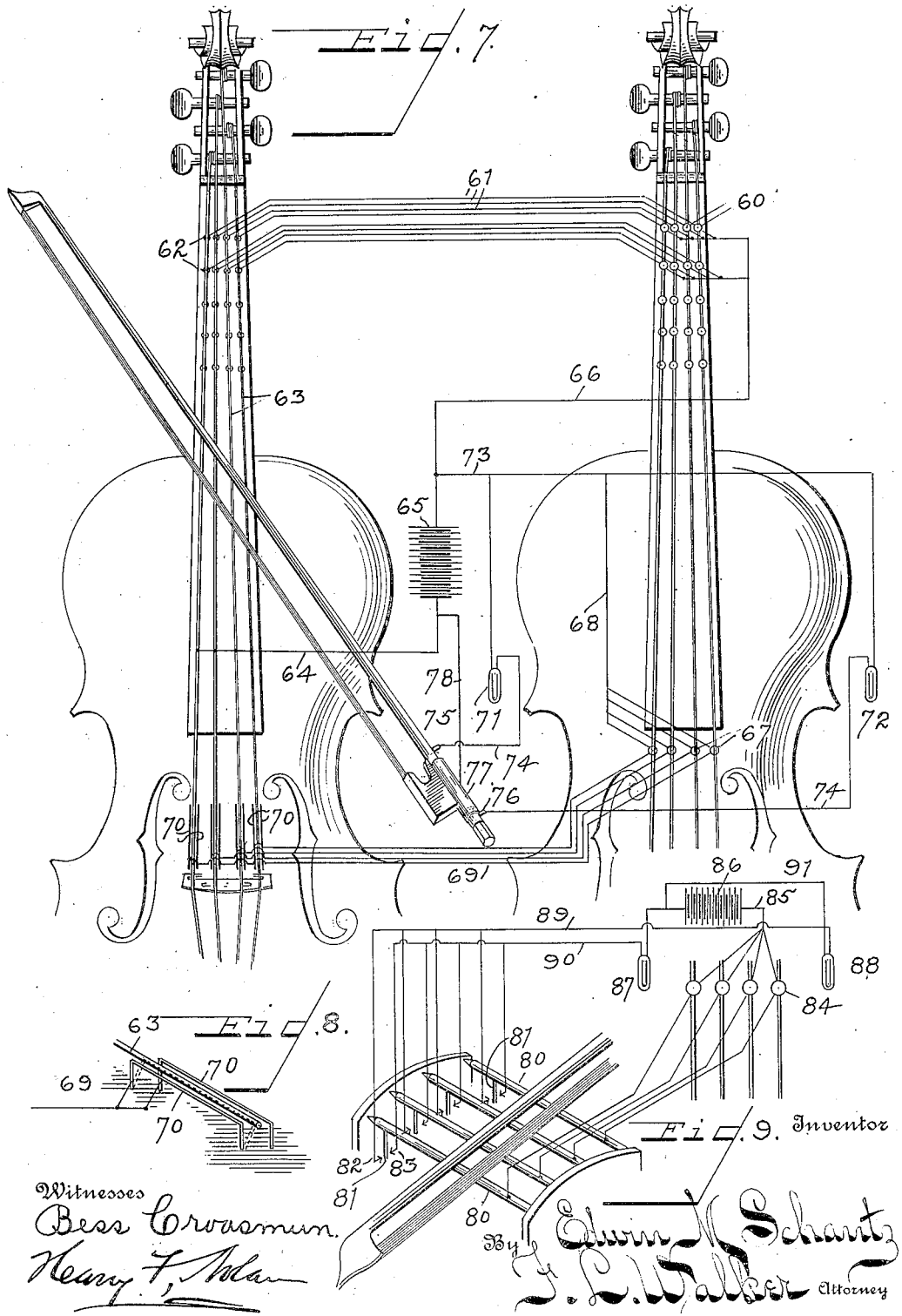

UNITED STATES PATENT OFFICE.

EDWIN M. SCHANTZ, OF DETROIT, MICHIGAN.

INSTRUCTING-INDICATOR FOR MUSICAL INSTRUMENTS.

1,324,275.      Specification of Letters Patent.      Patented Dec. 9, 1919.

Application filed October 13, 1913. Serial No. 794,953.

*To all whom it may concern:*

Be it known that I, EDWIN M. SCHANTZ, citizen of the United States, residing at Detroit, in the State of Mich., have invented certain new and useful Improvements in Instructing-Indicators for Musical Instruments, of which the following is a specification.

My invention relates to the musical art and particularly to an indicating apparatus for instructing the novice to perform upon a musical instrument by indicating to him in predetermined sequence and for proper intervals of time, in accordance with the composition to be played, the proper operative element to be manipulated and the digit to be employed.

These indications are accomplished by means of visual signals energized in proper succession by the master or instructor who performs the operation and movement necessary to a proper rendering of the composition upon a clavier or master instrument removed from the student's musical instrument.

The musical instrument to be played is provided with a series of visual signals correlated with the operative or playing elements thereof, there being one such signal for each element and a second series of signals corresponding to the digits of the player to indicate with which digit the signaled operative or playing element should be manipulated. These signals are controlled by the manipulation of the corresponding element of the master or instructor's instrument.

The apparatus is designed to eliminate the tedium from the initial instruction by enabling the beginner to immediately play simple compositions, thereby arousing and holding his interest.

By the use of the apparatus herein described, a novice acquires a knowledge of musical matters and learns to reproduce simple musical compositions before he has learned to read the music or learned the signs and definitions somewhat as a child learns to talk long before he has learned to spell or mastered the rules of grammar. The apparatus is primarily intended for elementary instruction. After the pupil has familiarized himself with the mechanical operation of the instrument and has acquired a musical sense and after his enthusiasm is thoroughly aroused, he is gradually instructed in the rules, theory, signs and formal matters pertaining to music. Having acquired elementary knowledge, the apparatus herein described may be abandoned and the further instruction of the pupil made by the usual method.

The invention herein set forth is a modification of the apparatus described and claimed in my co-pending application Serial No. 764,060.

The invention embodied herein is claimed broadly in my co-pending application, Serial No. 619,290, filed Apr. 6, 1911, now bearing Ser. No. 280,654, renewed March 4, 1919, while another of my co-pending applications, Serial No. 185,740, filed August 11, 1917, covers the embodiment of my invention herein illustrated in Figures 1 and 2. Attention is also directed to my co-pending application Serial No. 764,060, filed April 28, 1913, in which the means for indicating the digits to be used in playing the indicated keys is claimed broadly.

The object of the invention is to simplify the structure as well as the means and mode of operation of such apparatus whereby they will not only be cheapened in construction, but will be more efficient in use, accurate in operation, under absolute control of the instructor and unlikely to get out of repair.

With the above primary and other incidental objects in view as will more fully appear in the specification, the invention consists of the features of construction, the parts and combinations thereof, and the mode of operation of their equivalents as hereinafter described and set forth in the claims.

Referring to the drawings, Fig. 1 is a perspective view of a piano to which the apparatus has been applied, the primary or instructor's instrument being shown at the right. Fig. 2 is a diagrammatic view of the electrical connections of the apparatus shown in Fig. 1. Figs. 2ª, 2ᵇ and 2ᶜ are modifications of details shown in Fig. 2. Fig. 3 is a view somewhat diagrammatic illustrating the method of operating a series of signals upon a piano or similar instrument by pneumatic means. Fig. 4 and Fig. 5 are detail views of mechanical means for operating signals associated with the keys of a piano or similar instrument. Fig. 6 illustrates the application of the invention to a guitar, the primary or master's instrument being shown to the left drawn on a slightly reduced scale. Fig. 6ª is a modified view of the construction shown in Fig. 6, illustrating the location of the signals on a chart as distinguished from an instrument. Fig. 7 illustrates the application of the invention to a violin in which signals are provided for indicating not only the operative or playing elements or strings to be manipulated but the finger positions and in addition thereto the direction of the bow movement. Fig. 8 is a detail view of the electrical contact forming a part of the apparatus disclosed in Fig. 7. Fig. 9 is a detail view somewhat diagrammatic of a modification of the apparatus disclosed in Fig. 7.

Like parts are indicated by similar characters of reference throughout the several views.

While the apparatus forming the subject matter hereof is particularly adapted for use with a piano, organ or similar instrument, it is to be understood that it is not limited to such use and may be adapted to various other instruments, two of which are shown in Figs. 6 and 7. It is obvious that the apparatus may be made a component part of a musical instrument or it may be a separate appliance to be employed in conjunction with an instrument of ordinary construction.

Referring to the drawings, 1 is a piano of ordinary construction of which 2 is the usual key board. Located at the side of the piano 1 is the primary or master's instrument 3, which comprises a clavier corresponding with the keyboard of the piano. The manipulation of the keys of the primary or master's instrument 3, however, produces no sound, but they serve only to operate certain signals to be hereinafter described. The keys 4 of the primary instrument 3 are of a size substantially equal to those of the piano and are mounted in a similar manner. A second operative instrument may be used in lieu of the silent instrument or clavier 3. Transversely disposed above the keys of the piano, is a bar 5, supported on its opposite ends by extendible arms 6, which engage the cheek blocks at the opposite ends of the key board. To enable the bar to be located in proper adjustment in relation with the keys, adjusting screws 7 are provided. Carried in the bar 5 are a series of signal lamps, one lamp for each key or operative or playing element. In order to distinguish the signals relating to the black keys, from those relating to the white keys, the signals are preferably arranged in two tiers, the black signals being located in the upper tier and the white key signals in the lower tier. It is obvious, however, that instead of arranging the signals in two tiers, signal lamps of different colors may be employed to distinguish the signals corresponding to the white and black keys. It is further obvious that in lieu of signal lamps, as shown in Figs. 1 and 2, movable targets operated by means of magnets of solenoids as shown in Fig. 2ª, may be employed.

Immediately above the signals 8, corresponding with the keys of the instrument, are outlines of two hands upon each digit of which is located a signal 9, to indicate the digit to be employed in operating the signaled key.

The keys 4 of the primary or master's instrument 3 are pivoted at 10 in the usual manner and are provided with metallic face plates 11, which at the rear extremity of the key are adapted to make contact with a common terminal bar 12, when the forward ends of the keys are depressed. In the drawings, the face plates 11 of the keys are shown extended at the rear to form contact fingers 13 to engage the common terminal bar 12. Springs 14 are provided for returning the keys 4 to normal position to break the contact when pressure upon the forward end of the keys is released. The battery 15 or other source of electrical energy is connected by a line 16 with the common terminal bar 12. Each of the contact fingers 13 carried by the keys 4, is electrically connected by an individual line 17 with the corresponding signal 8 located immediately above the piano key 2 corresponding with the control key 4. The several signal lamps 8 are connected by a common return line 18 with the battery 15. Upon the depression of a key 4 the contact finger 13 engages the terminal bar 12, thereby closing a circuit from the battery 15 through the line 16 to the terminal bar 12, thence through the contact finger 13 and the line 17 to the lamp 8, and through the common return line 18 to the battery. This energizes the particular signal 8 corresponding to the key of the primary instrument depressed and it indicates to the pupil the corresponding key 2 of the piano to be manipulated.

In order to indicate to the pupil the proper digit to be employed, the master or instructor while manipulating the keys of the primary instrument 3 wears either contacts as at 2ᶜ or gloves 19 preferably of silk or some thin material having located in each finger and the thumbs thereof a small metallic contact 20 preferably of wire gauze. These metallic contacts 20 are connected by individual lines 21 with the signals 9 upon the corresponding digits of the outline drawn upon the bar 5 above the signals 8. These signals 9 are connected through a common return line 22 with the battery 15. When the master or instructor wearing the glove 19 depresses any one of the keys 4, the metallic contact 20 in the finger or thumb of the glove coming in contact with the metallic face plate 11 of the key 4, closes a circuit from the battery 15 through the line 16 to the common terminal bar 12, thence through the contact finger 13 and face plate 11, which have been brought into engagement with the common terminal bar 12 by the depression of the key, thence through the contact 20 and the line 21 to the corresponding signal lamp 9 from which the current passes through a common return line 22 to the battery, thus completing the circuit and energizing the lamp 9 to indicate to the pupil the proper digit to be employed.

It is obvious that in lieu of the gauze contact 20, and the metallic face plate 11, spring contacts as indicated in Fig. 2$^b$ may be employed in which case one contact is connected with the battery and the other with the lamp, the two contacts being brought together by the pressure of the fingers in depressing the key 4. Such contacts might be carried upon the face of the key or may be carried by a glove to be worn by the instructor or be otherwise carried upon the fingers. It will thus be seen that each depression of a key 4 of the primary instrument 3 will cause the signal 8 related with the corresponding key of the piano to be energized and by the means of the contact 20 closed by the finger of the instructor the signal 9 corresponding to the digit employed will be likewise energized simultaneous with the operation of the signal 8.

Located in the common return line 18 and 22 are switches 23 and 24 which enable either the key signals or the digit signals to be operated independently.

Referring to Fig. 3 wherein there is shown a pneumatic control apparatus for the signals, 2 indicates the keys of the piano and 4 the keys of the primary or master's instrument. The primary or master's instrument is provided with a suction pump or bellows 25 operated by pedals 26 in the manner commonly employed in mechanical players. Located above the keys 2 of the piano is a series of air cylinders 27, each connected by an outlet conduit 28 with a common suction conduit 29 leading to the pump or bellows 25. Located within each of the cylinders 27 is a piston 30 having a stem 31 bearing at its extremity a target or head 32. So long as suction is maintained within the cylinders 27 by means of the pump 25, thereby producing a partial vacuum within the cylinders, the pistons 30 will be held in their elevated positions by atmospheric pressure in which positions the targets or heads 32 will be concealed behind a blind or screen 33. Leading to each of the air cylinders 27 is an air inlet conduit 34, having at its opposite extremity an air inlet valve 35 controlled by the movement of the corresponding key 4. The construction is such that upon the depression of any one of the keys 4 the valve 35 is opened to admit air to the cylinder 27 corresponding with the depressed key thereby permitting the piston 30 of such cylinder to fall, exposing the target or head 32 beneath the blind or screen 33 to indicate the corresponding key 2 of the piano to be manipulated. Upon the release of the key 4 of the primary instrument the air inlet conduit will be closed by the return of the key to its normal position and thereupon the suction pump or bellows 25 will exhaust the air from the cylinder 27 causing the piston 30 to be again elevated to conceal the target or head behind the screen or blind 33. It will be thus seen that at the depression of each key of the primary or master's instrument, the corresponding signal or target will be energized to indicate the corresponding key of the piano to be manipulated.

In the construction shown in Fig. 4 the primary or master's instrument is permanently located beside the piano. Mounted in suitable bearings 37 is a series of rock shafts 38, each extending from a point opposite a key of the student's instrument to a point above the corresponding key or operative or playing element of the primary instrument having an arm 39 resting thereon and at its opposite ends an arm 40 carrying a target or head 41 positioned immediately above the corresponding key or element of the piano. The targets 41 are normally concealed behind a blind or screen 42. Upon the depression of any key 4 of the primary instrument, the arm 39 resting thereon and following the key throughout its downward movement, causes an oscillatory movement of the shaft 38 to oscillate the arm 40 at the opposite end of the shaft 38 thereby causing the target or head 31 to be exposed beneath the screen or blind 32 to indicate the corresponding key of the piano. Thus the keys of the piano will be indicated in a predetermined sequence corresponding with the manipulation of the keys 4 of the primary or master's instrument.

In Fig. 5 there is shown a similar apparatus comprising a plurality of pivoted levers 43, one for each key. These levers are connected at one end with the corresponding key 4 of the primary instrument and at the opposite end carry targets or heads 44 in a position immediately above the corresponding key of the piano. Such targets or heads are normally concealed behind a blind or screen 45. Upon the depression of any key 4 of the primary instrument, the corresponding lever 43 is oscillated to elevate the head or target 44 above the blind 45, thereby indicating the corresponding key of the piano to be manipulated.

In applying the system herein described to wind or stringed instruments, signals may be located directly upon the student's instrument as shown in Fig. 6, but are preferably located upon a chart or diagram placed in position to be observed by the pupil as shown in Fig. 6$^a$. Referring to Fig. 6, 46 is the primary or master's instrument and 47 is the student's instrument, while in Fig. 6ᵃ, 47 illustrates a chart or diagram placed in position to be observed by the pupil. Thus it is obvious that these signals may be associated or identified with the keys or other elements in the mind of the pupil either by being directly located adjacent to or in register with the keys or elements, or by being located adjacent to or in register with representations of said keys or elements on a chart. Located upon the neck of the pupil's instrument (Fig. 6) or upon the portion of the chart (Fig. 6ᵃ) representing the neck of the instrument, adjacent to the frets, is a series of signal lamps 48 indicating the finger positions for producing various tones. Located in the neck of the primary or master's instrument in similar positions are metallic contacts 49, each connected with the corresponding signal upon the chart or the pupil's instrument by an individual line 50. The strings 51 of the primary or master's instrument are electrical conductors connected by a common line 52 with the battery 53, the opposite side of which is connected by the common line 54 with the several lamps or signals 48. The construction is such that as the instructor depresses any one of the strings 51 contact is made between the string 51 and the contact point 49, which closes a circuit from the battery 53 through the line 52 and the string 51 depressed, to the contact 49 thence through the individual line 50 to the corresponding lamp or signal 48 and returning thence to the battery 53 through the common return line 54. Thus the circuit is closed and the signals are energized to indicate upon the chart or upon the pupil's instrument the finger positions corresponding to the positions of the instructor's fingers upon the primary instrument.

To indicate the succession in which the several strings should be manipulated, when a plurality of strings are being held down or fretted and to indicate the playing of open strings, a second series of lights 55 are provided upon the pupil's instrument or upon the chart, there being one signal of the series corresponding to each string. These lights or signals 55 are connected by a common line 56 with the battery 53. They are likewise connected by individual lines 57 with metallic studs or contacts 58 located upon the primary instrument adjacent to the string 51. The construction is such that the manipulation of any string 51 of the primary instrument will bring that string into contact with the adjacent stud or contact 58, thereby closing a circuit from the battery 53 through the line 52 to the string 51 manipulated, thence through said string to the contact 58 and from the contact through the individual line 57 to the corresponding lamp 55 and thence through the common return line 56 to the battery. Thus each time a string is manipulated upon the primary instrument the corresponding lamp or signal upon the chart of the pupil's instrument will be energized.

In order to indicate the particular fingers or digits to be employed in manipulating the strings 51 which constitute the playing elements of the guitar shown in Fig. 6 digit signals 59, one for each finger, similar to the signals 9 previously described, are employed. There is one signal 59 for each finger. The instructor wears upon his hand, indicated at 92, a glove such as is shown at 19, Fig. 2, having thereon contacts similar to those indicated at 20, Fig. 2. In lieu of the glove 19 the instructor may employ contacts such as those shown in Figs. 2ᵃ and 2ᵇ or contacts of similar character which may be attached one to each finger. These digit contacts are connected through individual lines 93 with the corresponding digit signals 59. The engagement of any finger contact with a string 51 of the master device will close a circuit from the battery through the line 52 to the manipulated string or playing element, thence through said string 51 to the finger contact, thence through the corresponding digit signal line 93 to the digit signal 59 corresponding to the finger employed and through the common return line 54 to the battery.

The application of the system to a violin as shown in Fig. 7 is somewhat similar to the application to a guitar in that a series of signals or lights 60 are located upon the neck of the pupil's instrument or upon that portion of the chart representing the neck of such instrument. Such signals or lamps 60 are connected by individual lines 61 with contacts 62 located in the neck of the primary or instructor's instrument. The strings 63 of the primary or instructor's instrument are electrical conductors and are connected through a common line 64 to the battery 65. The opposite side of the battery 65 is connected through a common line 66 with the several signals 60 of the series. Upon the depression of any string 61 at the proper finger position upon the primary or instructor's instrument, such strings make contact with the contact 62, thereby closing a circuit from the battery 65 through the common line 64 to the strings 63 thence through the strings to the contact 62 and through the individual line 61 to the signal, from whence the current returns to the battery through the common line 66. Thus the signal or lamp 60 is energized to indicate the particular position of the instructor's fingers upon the primary instrument. Like the guitar construction, there is likewise provided a second series of lamps or signals 67 corresponding with the strings of the instrument. These signals are designed to indicate the particular strings to be manipulated. These signals are connected by a common line 68 with the battery 65 and are connected by individual lines 69 with contact members 70 associated with the strings 63 of the primary or master's instrument. In Fig. 7, the contact members 70 are shown in the form of metallic arches arranged in pairs, the members of each pair being located upon opposite sides of the strings 63 as shown in Fig. 8. These metallic arches are flexible and are capable of being bent laterally into contact with the strings 63 to close the circuit. On an up bow movement the contact members 70 at the left of the string will be bent into engagement with the string to close the circuit, while on a down bow movement, the contact members 70 at the right of the strings being played will be flexed. The engagement of a contact member 70 with a corresponding string, closes a circuit from the battery 65 through the line 64 to the operated string, thence to the contact member 70 and through the individual line 69 to the signal or lamp 67 and thence through the common return line to the battery. Thus the engagement of any string 63 by the bow will be indicated by the operation of the corresponding signal 67 upon the pupil's instrument or upon the chart. To indicate the direction of movement of the bow, there are provided two additional lights or signals 71 and 72 indicating respectively up bow and down bow movement. These signal lamps 71 and 72 are connected through a common line 73 with the battery. At their opposite sides the lamps are connected by individual lines 74 with corresponding studs or contact 75 and 76 upon the bow. Located upon the bow intermediate the studs or contact 75 and 76 is a sliding sleeve 77, electrically connected with the battery 65 by a line 78. The sleeve 77 is permitted only a very slight movement sufficient to break its contact with one stud or contact 75 and make contact with the other stud or contact 76 or vice versa. In an up bow movement, the sleeve will break its contact with the stud 76 and will make contact with the stud 77, while upon a down bow movement, it breaks its contact with the stud 77 and makes contact with the stud 76. Thus the circuit is closed from the battery 65 through the line 78 to the sleeve 77 thence through the stud 75 or 76, according to the direction of the movement of the bow from which the current passes through the individual line 74 to the corresponding lamp 71 or 72 and thence through the common return line 73 to the battery, completing the circuit and energizing the signal to indicate to the pupil the direction of movement of the bow.

In Fig. 9 there is shown a modification of the foregoing construction in which rock shafts 80 are substituted for the strings of the primary or master's instrument. The rock shafts 80 are adapted to be oscillated by the movement of the bow thereon. Each rock shaft 80 carries a finger or arm 81 adapted to engage either one of two contacts 82 or 83, according to the direction of oscillation of the shaft due to the movement of the bow up or down. Each of the shafts 80 is electrically connected with the corresponding signal or lamp 84 upon the pupil's instrument or upon the chart indicating the string corresponding to the shaft. These signals are connected by a common return 85 with the battery 86. In addition, signals 87 and 88 are provided, indicating up bow and down bow respectively. The contacts 82, one for each rock shaft 80, are connected by a common line 89 with the down bow signal 88, while the contacts 83, one for each rock shaft, are connected by a common line 90 with the up bow signal 87. These signals 87 and 88 are connected by a common line 91 with the battery. On the down bow movement, the shaft 80 is oscillated to move the finger or arm 81 to the left, where it makes contact with the terminal 82, thereby closing the circuit. The current will pass from the battery 86 through the line 85 to the corresponding signal lamp 84, thence through the individual line to the oscillated shaft and through the finger 81 to the contact 82 thence through the common line 89 to the down bow signal 88 returning through the common return line 91 to the battery. This closes the circuit and energizes the signal 84 corresponding to the shaft oscillated, which in turn corresponds to the string of the instrument to be manipulated. Upon an up bow movement the direction of oscillation of the shaft 80 will be reversed and the finger 81 will make contact with the terminal 83, thereby closing the circuit from the battery 86 through the line 85 to the corresponding signal 84, thence through the individual line to the shaft oscillated and through the finger 81 to the terminal 83 and through the common return line 90 to the up bow signal 87 from which it passes through the common line 91 to the battery. It will be seen that the up bow or down bow signal is energized simultaneously with the energizing of the string signal. By the oscillation of the shaft 80 either the signal 87 or the signal 88 is brought into common circuit with one of the signals 84. The particular signal 87 or 88 operated depends upon the direction in which the shaft is oscillated, which in turn depends upon the direction of the movement of the bow thereon and the particular signal 84 depends upon the particular shaft oscillated. It will thus be seen that the apparatus serves to indicate to the pupil, not only the position in which he shall place his fingers, but the particular string to be manipulated and the direction of movement of the bow in manipulating such string. The pupil by observing the sequence of operation of the signals upon the chart or upon his instrument as the case may be, is enabled to operate the strings, keys or other operative elements of the instrument, in corresponding sequence. The term "register" as used in certain of the appended claims in introducing the "signals" or "indicators" has been employed to indicate the order in which said signals or indicators are arranged relative to the keys or strings of a musical instrument, and not to indicate or define the location of said signals or indicators, as it is obvious that they may be placed in various locations other than those shown in the drawings without departing from the spirit of the invention.

From the above description it will be apparent that there is thus provided a device of the character described, possessing the particular features of advantage before enumerated as desirable but which obviously is susceptible of modification in its form, proportion, detail construction or arrangement of parts, without departing from the principle involved or sacrificing any of its advantages.

While in order to comply with the statute, the invention has been described in language more or less specific as to certain structural features, it is to be understood that the invention is not limited to any specific details but that the means and construction herein described comprise but one mode of putting the invention into effect, and the invention is therefore claimed broadly in any of its possible forms or modifications within the scope of the appended claims.

Having thus described my invention, I claim:

1. The combination with a musical instrument having a plurality of elements to be manually manipulated in playing the same, of a plurality of signals each fixed in register with one of said elements, a plurality of other manually manipulated elements independent of said instrument for controlling said signals, one of said second-named elements being provided for each of said signals, and means controlled by the manipulation of said second-named elements for actuating said signals to pre-indicate the order in which said first-named elements shall be manipulated to play a musical composition.

2. The combination with a musical instrument having a plurality of elements to be manually manipulated in playing the same, of a series of signals each fixed in register with an adjacent one of said elements, and manually manipulated means for operating said signals from a point removed from said instrument to pre-indicate the order in which said elements shall be manipulated to play a musical composition.

3. In combination, a musical instrument having a plurality of elements to be manually manipulated in playing the same, a plurality of signals each fixed in register with one of said elements, one signal being provided for each element, a second series of elements to be manually manipulated by the instructor, and means actuated by the manipulation of said second named elements for actuating said signals to pre-indicate the order in which said first-named elements shall be manipulated in playing a musical composition.

4. In combination, a musical instrument having a plurality of elements to be manually manipulated by the player in playing the same, a series of signals each fixed in register with one of said elements, and manually operated means for actuating said signals in predetermined sequence independent of the manipulation of said elements to pre-indicate the order in which said elements shall be manipulated.

5. In combination, a musical instrument comprising a series of movable elements to be manipulated by the player, a series of indicators each fixed in register with one of said elements, a second series of manually manipulated elements, and means connected with said signals and actuated by said last-named elements for operating said signals in the order in which said last-named elements are manipulated.

6. The combination with a musical instrument having a plurality of elements to be manually manipulated in playing the same, of a series of electric lights each located adjacent one of said elements, an electric circuit having a branch connected to each of said lights, a second series of manually manipulated elements, and contacts connected in said branches and arranged to be closed when said last-named elements are actuated to energize said lamps and thereby indicate the order in which said first-named elements shall be manipulated.

7. The combination with a musical instrument having a plurality of elements to be manually manipulated in playing the same, of a plurality of signals each located adjacent one of said elements, a plurality of manually manipulated elements independent of said instrument, one of said second-named elements being provided for each of said signals, a plurality of contacts each controlled by one of said second-named elements, an electric circuit having a plurality of branches connected to one of said signals and including one of said contacts, whereby the manipulation of one of said second-named elements will actuate a corresponding signal, and means to cause each of said contacts to open when the adjacent second-named element is released.

8. A music instructing device comprising a series of elements to be manually manipulated, a series of signals, one for each of and arranged in the order of the digits of the operator employed in playing a musical instrument, and means for effecting the actuation of each of said signals by the operation of a corresponding digit in manipulating one of said elements.

9. A music instructing device comprising a series of elements to be manually manipulated, a series of signals arranged in the order of the digits of the operator, each signal being connected to each of the elements of said series, and means in combination with said signals and elements for actuating the signal corresponding to the digit of the operator employed in manipulating each of said elements.

10. In combination, a musical instrument having a series of elements to be manipulated by the player, a second series of similar elements to be manually manipulated, means operated by said second named elements for pre-indicating the order in which said first-named elements shall be manipulated in playing a musical composition, a series of signals, one for each digit of the player and means in combination with said signals and said second-named elements for actuating the signal corresponding to the digit of the operator employed in manipulating each of said second named elements to thereby indicate the digit to be employed in manipulating the corresponding element of said instrument.

11. In combination, a musical instrument having a series of elements to be manipulated by the player, a series of signals arranged in the order of said elements, a second series of signals one for each digit of the player, a second series of manually manipulated elements, operating connections to actuate said first-named signals by the manipulation of said second-named elements to indicate the order in which said first-named elements shall be manipulated in playing the same, and means combined with said last-named means and comprising parts carried by the digits of the operator manipulating said second-named elements to actuate one of said second-named signals simultaneously with the actuation of each of said first-named signals to indicate the digit to be employed in manipulating the corresponding first-named element.

12. The combination with a musical instrument comprising a series of elements to be manually manipulated by the player and controlled by operating said elements in various "stop" positions, of a series of signals each located adjacent one of said elements to indicate successive "stop" positions to be maintained with respect to each of said elements during the manipulation thereof, and means for actuating said signals.

13. The combination with a musical instrument comprising a series of elements to be manually manipulated by the player and controlled by operating said elements in various "stop" positions, of a series of signals each located adjacent one of said elements to indicate successive "stop" positions to be maintained with respect to each of said elements during the manipulation thereof, a second series of manually manipulated elements, and means actuated by the manipulation of said second named elements for operating said signals.

14. A music instructing device comprising a series of elements to be manually manipulated, a series of signals arranged in the order of said elements, means actuated by the manipulation of said elements to actuate said signals to indicate the order in which said elements are manipulated, a second series of signals one for each of the digits of the player, means in combination with said first-named means to actuate said second-named signals to indicate the digit employed in manipulating each of said elements, a third series of signals one for each of certain "stop" positions in which said elements may be manipulated, and means in combination with said first-named means and actuated by the manipulation of said elements to indicate successive "stop" positions maintained during the manipulation of said elements.

15. In combination, a musical instrument comprising a series of elements to be manually manipulated in playing the same, a series of electrically operated signals each fixed in register with one of said elements, one signal being provided for each of said elements, a second series of manually operated elements arranged in the order of said first-named elements but independent thereof, an electric circuit comprising branches for each of said signals, and electrical contacts arranged to be closed by the manipulation of said second named elements to actuate the corresponding signals and thereby indicate the order in which the elements of said instrument shall be manipulated.

16. In combination, a musical instrument comprising a series of elements to be manually manipulated in playing the same, a series of electrically operated signals each fixed in register with one of said elements, one signal being provided for each of said elements, a second series of manually operated elements arranged in the order of said first-named elements but independent thereof, an electric circuit comprising branches for each of said signals, electrical contacts arranged to be closed by the manipulation of said second named elements to actuate the corresponding signals and thereby indicate the order in which the elements of said instrument shall be manipulated, a second series of electrically operated signals, one for each digit of the player, and means in combination with said electric circuit and said second-named elements to actuate said second-named signals to indicate the digit employed in manipulating said second-named elements.

17. The combination with a musical instrument comprising a plurality of elements to be manually manipulated by the player, of a series of electrical signals each fixed in register with one of said elements, a plurality of electric circuits each connected to one of said signals, a plurality of electric contacts each connected in one of said circuits, and a second series of manually manipulated elements each arranged to operate one of said contacts, whereby the manipulation of said second-named elements closes said circuits and thereby actuates said signals to indicate the order in which said first-named elements shall be manipulated.

18. A music instructing device comprising a series of manually manipulated elements, a series of electrically operated signals one for each of the digits of the operator, an electric circuit comprising branches each connected to one of said signals, and contacts connected in said branch circuits and arranged to be closed by the manipulation of said elements to actuate said signals and thereby indicate the digit employed in manipulating each of said elements.

19. A music-instructing device comprising a series of elements to be manually manipulated, a series of electrically operated signals one for each of the digits of the operator, a circuit comprising a branch for each of said signals, an individual contact for each branch circuit adapted to be carried by one of the digits to be employed in manipulating said elements, and other contacts connected in said circuit and arranged to form an electrical connection with one of said first-named contacts upon manipulation of the corresponding element by a digit carrying one of said second-named contacts.

20. A music instructing device comprising a series of elements to be manually operated by the operator, a series of electrically operated signals, a circuit for each of said signals, electrical contacts connected to the circuits of each of said signals and arranged adjacent said elements, and contacts to be worn on the fingers of the operator and connected in the circuits of said signals, whereby the operator of any of said elements by a particular digit will cause one of said last-named contacts to engage one of said first-named contacts and close the circuit to the signal corresponding to that digit.

21. A music instructing device comprising a series of electrically operated signals, one signal being provided for each of the digits employed in manually manipulating the playing elements of a musical instrument, a circuit for each of said signals, a plurality of electrical contacts, each of said contacts being connected to all of said signals, a separate set of contacts each carried by one of the digits of the operator and connected with one of said signals, said last-mentioned contacts being arranged to close a circuit through the respective signals when brought into electrical connection with any contact of the first-mentioned series, and a source of electric energy for energizing said circuits.

In testimony whereof, I have hereunto set my hand this 8th day of October, 1913.

EDWIN M. SCHANTZ.

Witnesses:
HARRY F. NOLAN,
BESS CROASMUN.